(12) United States Patent
Auger

(10) Patent No.: US 10,486,486 B2
(45) Date of Patent: Nov. 26, 2019

(54) TUNABLE VEHICLE SUSPENSION ASSEMBLY

(71) Applicants: MAGNA INTERNATIONAL INC., Aurora (CA); Marc Donald Auger, Royal Oak, MI (US)

(72) Inventor: Marc Donald Auger, Royal Oak, MI (US)

(73) Assignee: Magna International Inc., Aurora (CA)

( * ) Notice: Subject to any disclaimer, the term of this patent is extended or adjusted under 35 U.S.C. 154(b) by 70 days.

(21) Appl. No.: 15/572,667

(22) PCT Filed: May 6, 2016

(86) PCT No.: PCT/US2016/031220
§ 371 (c)(1),
(2) Date: Nov. 8, 2017

(87) PCT Pub. No.: WO2016/182914
PCT Pub. Date: Nov. 17, 2016

(65) Prior Publication Data
US 2018/0134108 A1 May 17, 2018

Related U.S. Application Data

(60) Provisional application No. 62/158,681, filed on May 8, 2015.

(51) Int. Cl.
*B60G 21/05* (2006.01)

(52) U.S. Cl.
CPC ........ *B60G 21/051* (2013.01); *B60G 2200/20* (2013.01); *B60G 2200/22* (2013.01); *B60G 2206/20* (2013.01)

(58) Field of Classification Search
CPC .............. B60G 21/051; B60G 2206/20; B60G 2200/20; B60G 2200/22
See application file for complete search history.

(56) References Cited

U.S. PATENT DOCUMENTS

| | | | |
|---|---|---|---|
| 4,637,628 A * | 1/1987 | Perkins | B60G 9/003 267/273 |
| 2003/0071516 A1 | 4/2003 | Biard et al. | |
| 2003/0141757 A1 | 7/2003 | Deletombe | |
| 2007/0069496 A1* | 3/2007 | Rinehart | B21D 53/88 280/124.166 |
| 2008/0111336 A1 | 5/2008 | Aubarede et al. | |
| 2009/0022142 A1* | 1/2009 | DeLorme | H04L 65/1069 370/352 |
| 2011/0254242 A1 | 10/2011 | Eismann et al. | |

FOREIGN PATENT DOCUMENTS

EP      1674307 A1    6/2006

* cited by examiner

*Primary Examiner* — Darlene P Condra
(74) *Attorney, Agent, or Firm* — Dickinson Wright PLLC

(57) ABSTRACT

The vehicle suspension component includes first and second trailing arms that are spaced from one another for attachment with vehicle wheels. The suspension component also includes at least one cross-member that is rigidly connected with the first trailing arm and is operably connected with the second trailing arm in a non-rigid manner. A rotation inhibitor operably connects the at least one cross-member with the second trailing arm and resiliently resists rotation of the at least one cross-member relative to the second trailing arm.

8 Claims, 6 Drawing Sheets

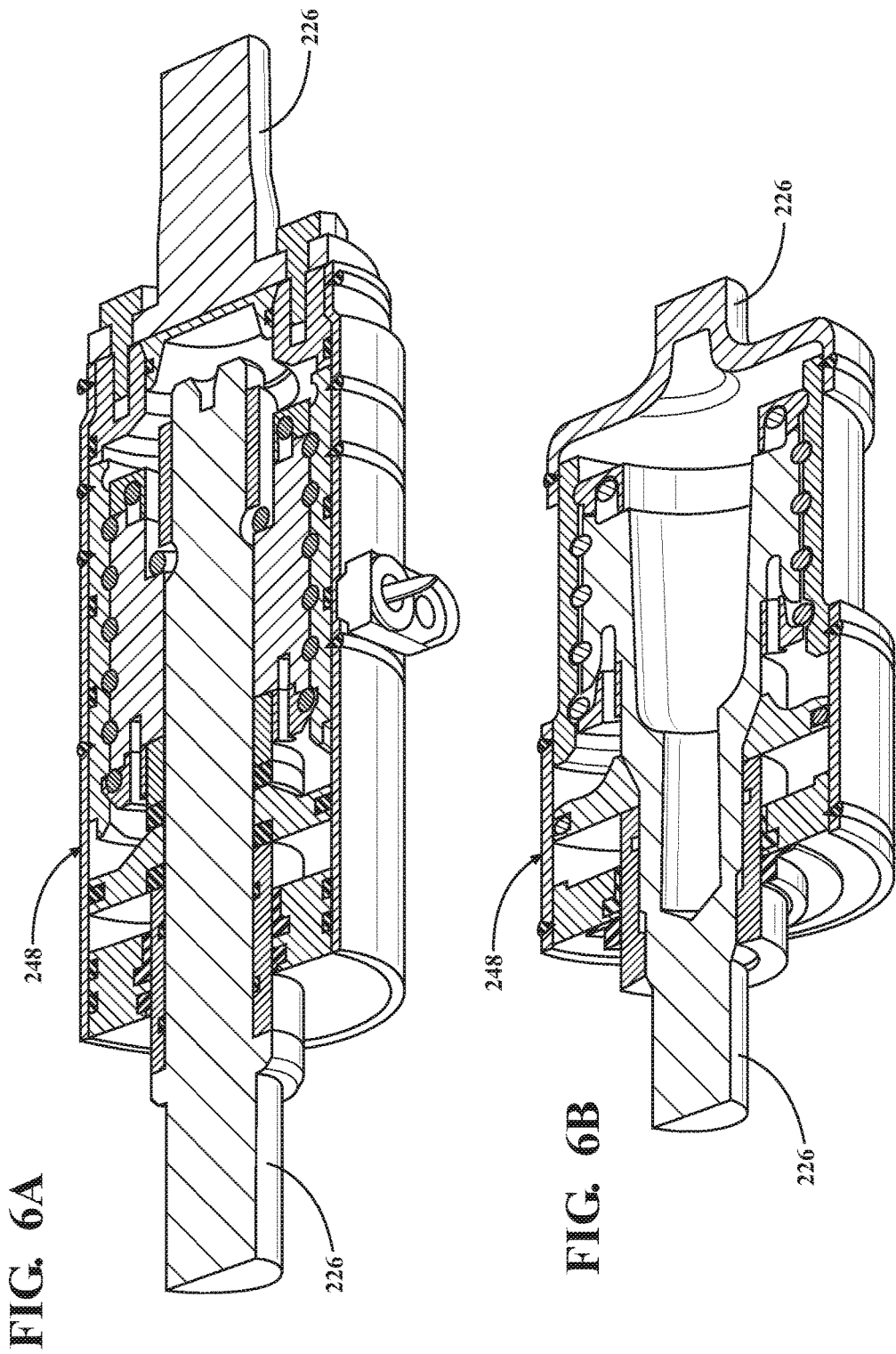

TUNABLE VEHICLE SUSPENSION ASSEMBLY

CROSS REFERENCE TO RELATED APPLICATIONS

This U.S. National Stage Patent Application claims the benefit of PCT Patent International Application Serial No. PCT/US2016/031220 filed May 6, 2016 entitled "Tunable Vehicle Suspension Assembly" which claims the benefit of U.S. Provisional Patent Application Ser. No. 62/158,681 filed on May 8, 2015 entitled "Tunable Twist Axle Assembly," the entire disclosures of the applications being considered part of the disclosure of this application and hereby incorporated by reference.

BACKGROUND OF THE INVENTION

1. Field of the Invention

The present invention is related generally to components for vehicular suspension systems.

2. Related Art

Many vehicles include suspension systems with a twist axle assembly which is connected with either the front or rear wheels of the vehicle. Such twist axle assemblies generally are include a pair of trailing arms which are operatively connected with the wheels and a torsion tube which extends between opposite ends that are attached with the trailing arms. The attachments between the ends of the torsion tube and the trailing arms are typically of the rigid type, such as welds. As such, during operation of the twist axle assembly, when one of the trailing arms pivots or rotates relative to the other trailing arm, such as while the vehicle is cornering at high speeds, the relative rotation causes the torsion tube to resiliently twist. The torsional stiffness of the torsion tube controls the forces that are required to rotate the trailing arms relative to one another, which impacts the characteristics of the suspension system and the performance of the vehicle.

In general, differently configured torsion tubes are required to create twist axle assemblies with different torsional stiffnesses. For example, some characteristics which have an effect on the torsional stiffness of a torsion tube are the size, shape and material of the torsion tube. As such, in many instances different torsion tubes are required not only for different types of vehicles (for example, sedans, crossover utility vehicles, sport utility vehicles, etc.) but sometimes for different configurations within the same vehicle. For example, manufacturer might sell a performance package of a vehicle that has a stiffer torsion tube than a comfort package of the same vehicle.

SUMMARY OF THE INVENTION AND ADVANTAGES

One aspect of the present invention is for a vehicle suspension component. The vehicle suspension component includes first and second trailing arms that are spaced from one another for attachment with vehicle wheels. The suspension component also includes at least one cross-member that is rigidly connected with the first trailing arm and is operably connected with the second trailing arm in a non-rigid manner. A rotation inhibitor operably connects the at least one cross-member with the second trailing arm and resiliently resists rotation of the at least one cross-member relative to the second trailing arm.

The vehicular suspension component of this aspect of the present invention is advantageous as compared to conventional twist tube assemblies because the rotation inhibitor, not a torsion tube, defines the resistance to relative rotation between the trailing arms. As such, all of the components of the vehicular suspension component can be used in with suspension components of a wide range of different vehicles with different performance characteristics, thereby providing significant cost savings through economies of scale. The vehicular suspension component also may allow for a vehicle owner to easily alter the performance characteristics of his or her vehicle by simply replacing the rotation inhibitor.

According to another aspect of the present invention, the rotation inhibitor includes a bushing that is made of an elastic material and is compressible for resisting rotation of the at least one cross-member relative to the second trailing arm in one rotational direction and is stretchable for resisting rotation of the at least one cross-member in an opposite rotational direction.

According to yet another aspect of the present invention, the at least one cross-member is a single beam which extends through an opening in the second trailing arm with a bearing being interposed between the beam and the second trailing arm for allowing the beam and the second trailing arm to rotate relative to one another.

According to still another aspect of the present invention, the rotation inhibitor further includes a stiff arm which extends radially from the at least one cross-member and wherein the bushing is interposed between the stiff arm and the second trailing arm.

According to a further aspect of the present invention, the rotation inhibitor further includes a sleeve which is fixedly attached with the stiff arm and is fixedly attached with the at least one cross-member.

According to yet a further aspect of the present invention, the sleeve is welded with the at least one cross-member.

According to still a further aspect of the present invention, the rotation inhibitor includes a blade which is operably coupled with the at least one cross-member and with the second trailing arm and which is deflectable for resisting relative rotation between the at least one cross-member and the second trailing arm.

According to another aspect of the present invention, the rotation inhibitor includes a blade which is operably coupled with the at least one cross-member and with the second trailing arm and which is deflectable for resisting relative rotation between the at least one cross-member and the second trailing arm.

According to yet another aspect of the present invention, the blade is made of a spring steel material.

According to still another aspect of the present invention, the at least one cross-member includes a pair of cross-members with one of the cross-members being fixedly attached with the first trailing arm and the other of the cross-members being fixedly attached with the second trailing arm and wherein the rotation inhibitor includes a coupling which interconnects the pair of cross-members with one another and actively resists rotation of the cross-members relative to one another.

Another aspect of the present invention is related to a twist axle assembly for a vehicle suspension. The twist axle assembly includes first and second trailing arms, each of which has a wheel carrier for attachment with a wheel assembly. At least one cross-member is fixedly attached with the first trailing arm and is operably connected with the second trailing arm in a non-fixed manner. A rotation inhibitor operably connects the at least one cross-member with the second trailing arm and resiliently resists rotation of the at least one cross-member relative to the second trailing arm.

According to another aspect of the present invention, the rotation inhibitor includes an elastically deflectable body which deforms elastically in response to relative rotation between the at least one cross-member and the second trailing arm.

According to yet another aspect of the present invention, the elastically deflectable body is a bushing which is positioned between a stiff arm that extends radially away from the at least one cross-member and the second trailing arm.

According to still another aspect of the present invention, the deflectable body is a flexible blade which extends radially from the cross-member to the second trailing arm.

According to a further aspect of the present invention, each of the first and second trailing arms includes a body mount for attachment with a body of a vehicle and a spring seat for supporting a coil spring.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 4a is a perspective and enlarged view of a portion of the twist axle assembly of FIG. 3 and showing a flexible blade in one rotational orientation;

FIG. 4b is another perspective and enlarged view of a portion of the twist axle assembly of FIG. 3 and showing the flexible blade in a different rotational orientation than FIG. 4a;

FIG. 6a is a cross-sectional view of a coupler of the third exemplary embodiment of the twist axle assembly shown in FIG. 3; and FIG. 6b is a cross-sectional view of an alternate coupler for the twist axle assembly of FIG. 3.

DETAILED DESCRIPTION OF THE ENABLING EMBODIMENT

Figure 1:
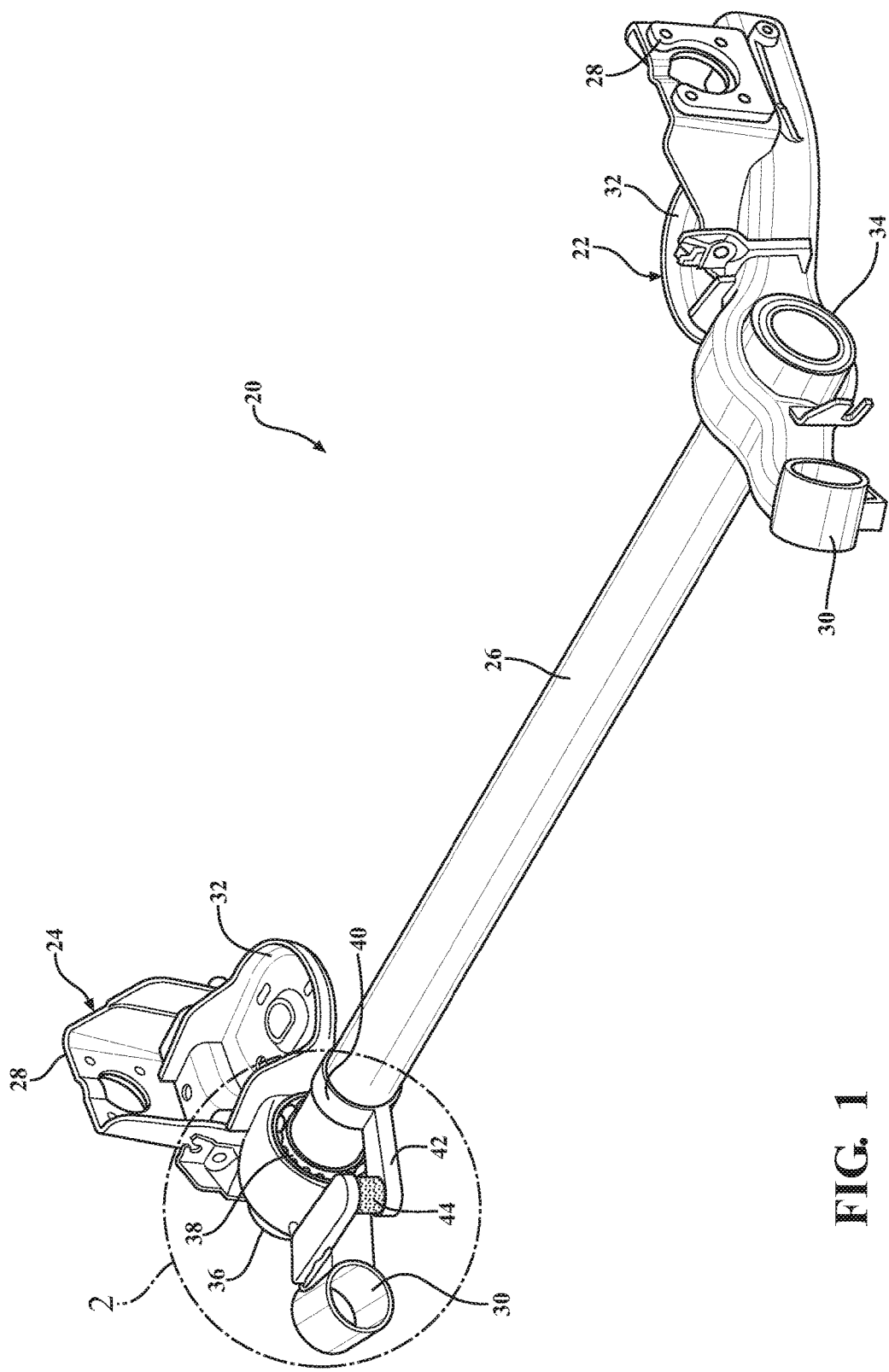
FIG. 1 is a perspective elevation view of a first exemplary embodiment of a twist axle assembly constructed according to one aspect of the present invention.
Figure 2:
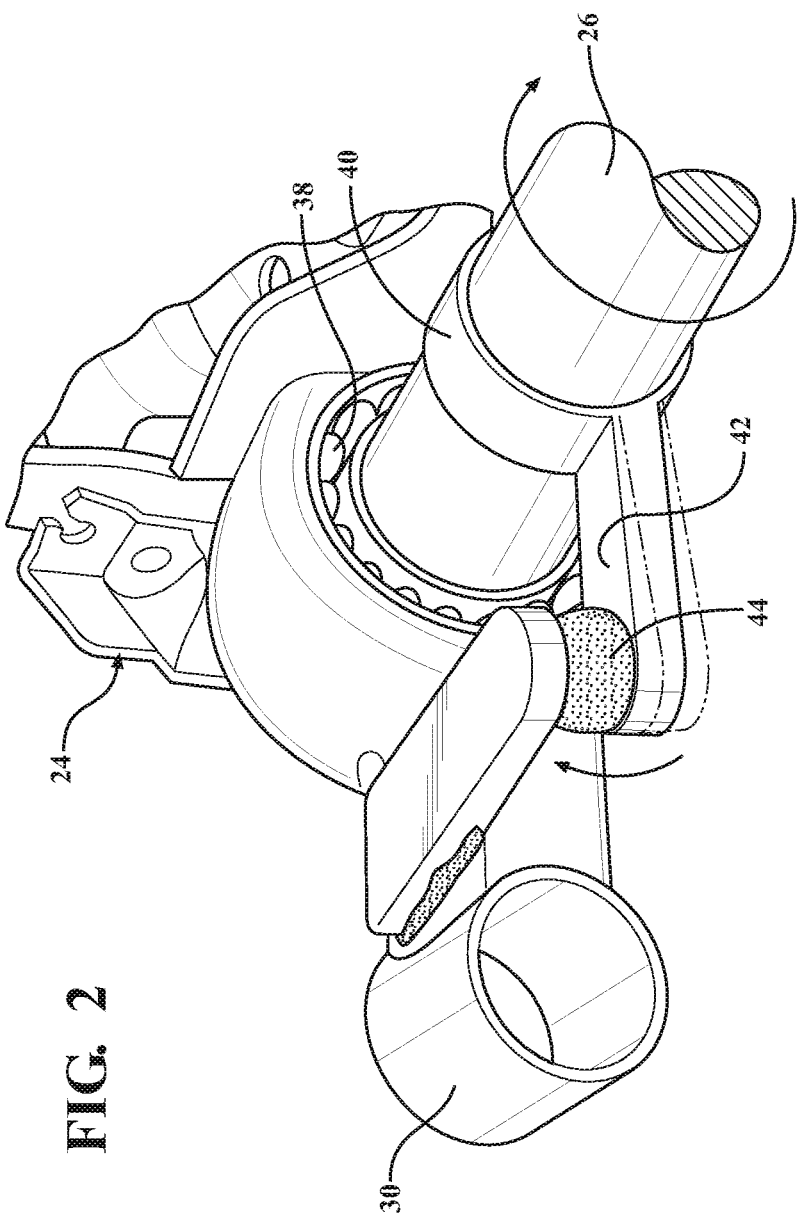
FIG. 2 is a perspective and enlarged view of a portion of the twist axle assembly of FIG. 1.

Referring to the Figures, wherein like numerals indicate corresponding parts throughout the several views, a first exemplary embodiment of a tunable vehicle suspension assembly 20 for a suspension system of a vehicle is generally shown in FIGS. 1 and 2. The suspension assembly 20 includes a first and second trailing arms 22, 24 and a cross-member 26, or beam, that extends along an axis A between opposite ends that are operably connected with the trailing arms 22, 24. The vehicle suspension assembly 20 may find uses in a range of different types of vehicles including, sedans, sports cars, sport utility vehicles, light duty trucks and heavy duty trucks.

In the exemplary embodiment, each of the trailing arms 22, 24 has a wheel carrier 28 for attachment with a wheel assembly (not shown) of the vehicle, a body mount 30 for attachment with a vehicle body (not shown) and a spring seat 32 for supporting a coil spring (not shown). Each trailing arm 22, 24 may be made as an integral piece of a single piece of material or may be made of multiple pieces that are separately formed and are subsequently joined together. The trailing arms 22, 24 may also have a range of different shapes depending on the parameters of the particular application. The trailing arms 22, 24 are preferably made of a metal, such as steel or a steel alloy, but any suitable material or combination of materials may be employed.

In this embodiment, the cross-member 26 is generally cylindrical in shape and may be either a solid (i.e., non-hollow) or tubular in shape. However, it should be appreciated that the cross-member 26 could have a range of different shapes. The cross-member extends along a length between opposite first and second ends 34, 36. The first end 34 of the cross-member 26 is rigidly (i.e., fixedly) connected with the first trailing arm 22 through, for example, welding. The second end 36 of the cross-member is connected with the second trailing arm 24 in a non-rigid manner. Specifically, in the first exemplary embodiment of the twist axle assembly, the second end 36 is rotatably joined with the second trailing arm 24 via a bearing 38 which is has an outer race that is press-fit into an opening in the second trailing arm 24 and an inner race which is pressed onto the cross-member 26. The bearing 38 allows the cross-member 26 to rotate relative to the second trailing arm 24 during operation of the vehicle suspension. The bearing 38 could be any suitable type of bearing 38 including, for example, a needle, a ball bearing or a roller bearing.

The vehicle suspension assembly 20 additionally includes a rotation inhibitor which inhibits relative rotation between the cross-member 26 and the second trailing arm 24. Since the cross-member 26 is fixedly attached with the first trailing arm 22, the rotation inhibitor effectively resists in a resilient manner relative rotation between the first and second trailing arms 22, 24.

In the first exemplary embodiment, the rotation inhibitor includes a sleeve 40 which is fixedly attached with the cross-member 26 adjacent the second end 36 but between the bearing 38 and the first trailing arm 22. The sleeve 40 extends in an axial direction along a portion of the length of the cross-member 26 and is attached with the cross-member 36 through any suitable means including, for example, welding. A stiff arm 42 is fixedly attached with the sleeve 40 and extends radially outwardly therefrom to a distal end. The material and shape of the stiff arm 42 are selected to resist bending, particularly in a circumferential direction. That is, the stiff arm 42 has a high resistance to bending in a direction that is perpendicular to the axis A along which the cross-member 26 extends.

The rotation inhibitor further includes at least one bushing 44 which interconnects the stiff arm 42 with the second trailing arm 24. In this embodiment, the bushing 44 is positioned between the end of the stiff arm 42 and the second trailing arm 24. Specifically, in this exemplary embodiment, the bushing 44 is sandwiched between the end of the stiff arm 42 and a flange on the second trailing arm 24. The bushing 44 is made of an elastically compressible and stretchable material (such as certain plastics and rubbers) for resiliently transferring forces between the second trailing arm 24 and the stiff arm 42, cross-member 24 and first trailing arm 22 to allow the first and second trailing arms 22, 24 to rotate or pivot relative to one another during operation of the vehicle. As shown in FIG. 2, during operation of the vehicle suspension assembly 20, the bushing 44 compresses when the second trailing arm 24 rotates relative to the cross-member 26 in one direction and stretches when the second trailing arm 24 rotates relative to the cross-member 26 in an opposite direction. It should be appreciated that the stiff arm 42 and bushing 44 could take a range of different shapes and configurations. The bushing 44 may be joined with the stiff arm 42 and the second trailing arm 24 through any suitable means including, e.g., one or more fasteners or an adhesive.

During operation of the vehicle, when one of the wheel assemblies encounters an obstacle, such as a pothole, or the vehicle corners at speed, the trailing arms 22, 24 will attempt to rotate or pivot relative to one another. In contrast to conventional twist axle assemblies where a torsion tube elastically twists to resiliently resist, but not completely prevent, this relative rotation, in the first exemplary embodiment of the vehicle suspension assembly 20, the bushing 44 deforms to resiliently resist this relative rotation. As such, the configuration of the bushing 44 can be altered to adjust the performance of the vehicle suspension assembly 20. This is advantageous because all of the components of the vehicle suspension assembly 20 except the bushing 44 can be used for the suspensions of vehicles with different performance dynamics by simply incorporating different bushings 44. This allows for cost savings through economies of scale. Additionally, a vehicle owner can alter the performance characteristics of his or her vehicle by replacing the bushing 44 with a bushing that has a different stiffness.

Additionally, since the relative rotation between the first and second trailing arms 22, 24 is governed by the bushing 44, not the cross-member 26, the cross-member 26 does not have to be specifically shaped to have a precise torsional stiffness as is the case with the torsion tubes of other known twist axle assemblies. This allows for the use of a cross-member 26 which is less costly than the torsion tubes of other known twist axle assemblies. Among other factors, the stiffness of the vehicle suspension assembly 20 is dependent on the material, shape and size of the at least one bushing 44.

As such, the same trailing arms 22, bearing 30 and beam 24 can be used to make twist axle assemblies 20 with different stiffnesses by simply putting different bushings 36 in the twist axle assemblies 20. For example, one bushing 36 could be designed to optimize the stiffness of the twist axle assembly 20 for use in a sports sedan, and a different bushing 36 can be used to optimize the stiffness of the twist axle assembly 20 for use in a cross-over vehicle. Accordingly, the twist axle assembly 20 provides for significant manufacturing cost savings through economies of scale by allowing almost all of the same components of the twist axle assembly 20 to be used for different types and configurations of vehicles while still allowing for substantially different performance characteristics. Additionally, an existing twist axle assembly 20 can be quickly modified to have a different stiffness simply by changing the bushing 36, thereby allowing a car owner to adjust the performance characteristics of his or her vehicle at a very low expense. Still further, the bushing 36 may be an active component which automatically adjusts its stiffness to allow for automatic tuning of the twist axle assembly 20 during use of the vehicle.

Figure 3:
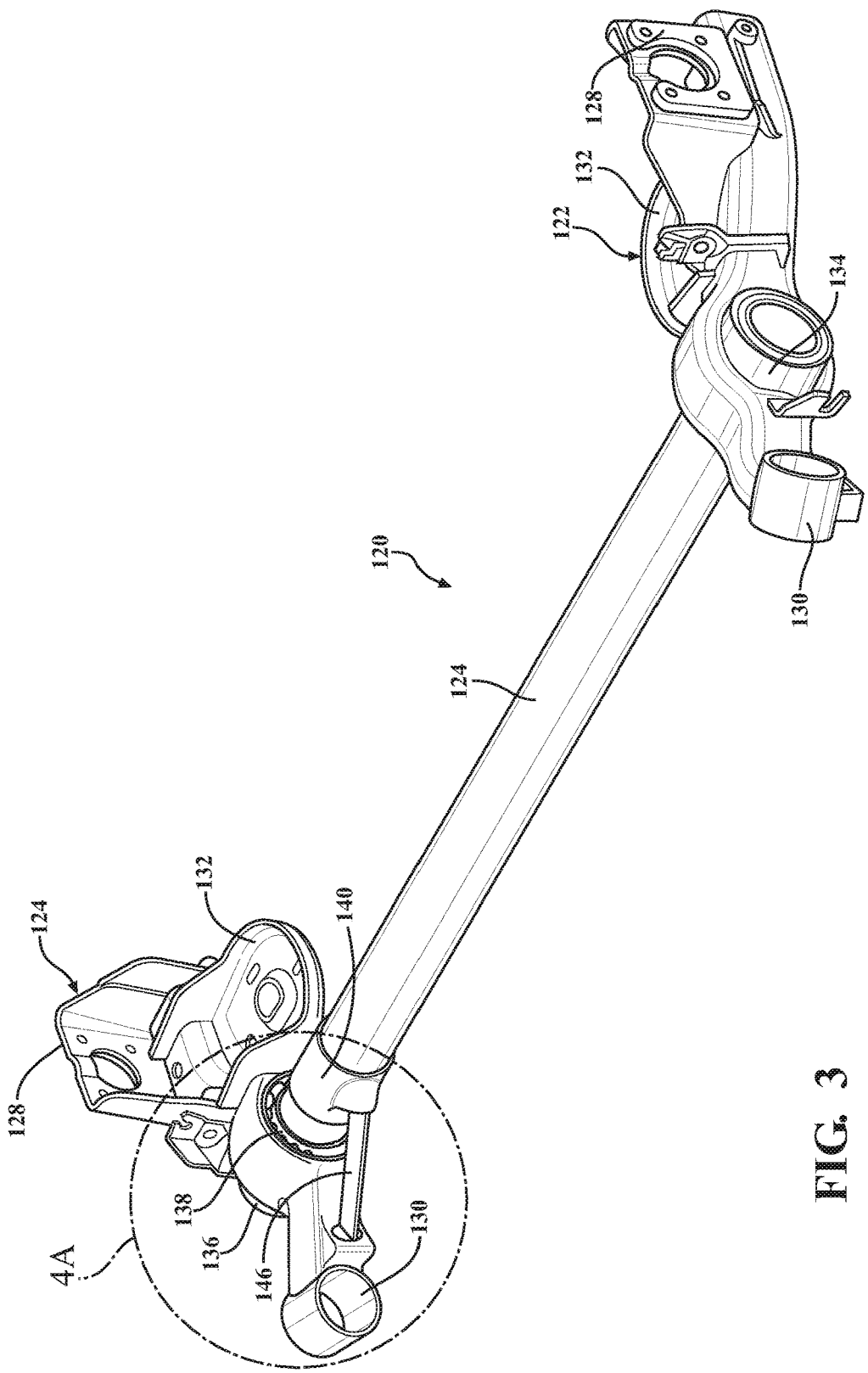
FIG. 3 is a perspective elevation view of a second exemplary embodiment of the twist axle assembly.
Figure 4:
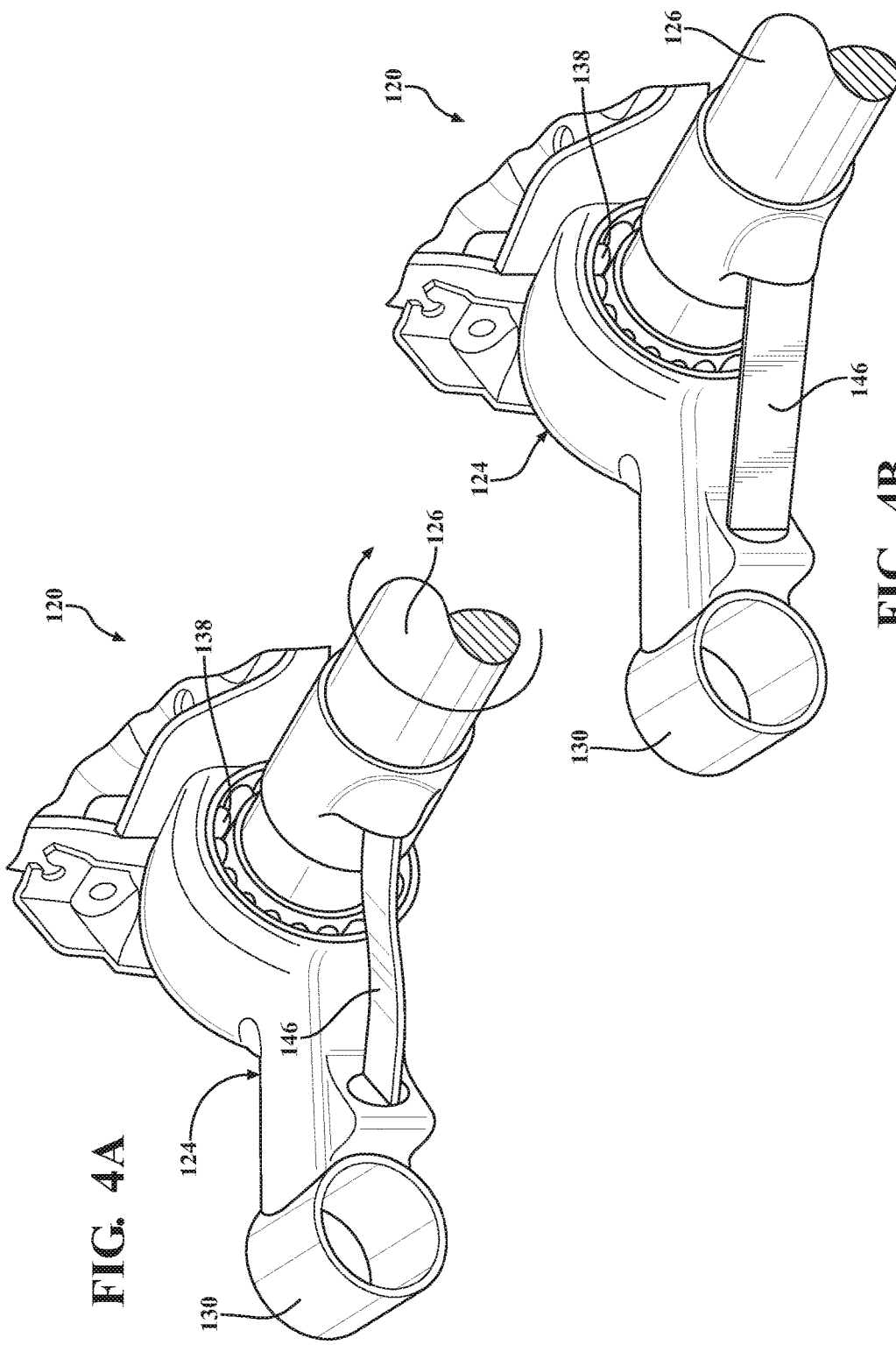

Referring now to FIGS. 3, 4a and 4b, a second exemplary embodiment of the vehicle suspension assembly 120 is generally shown with like numerals, separated by a prefix of "1", indicating corresponding parts with the first exemplary embodiment described above. The second exemplary embodiment is distinguished from the first exemplary embodiment in that it lacks the stiff arm and bushing of the first exemplary embodiment but instead has a flexible blade 146 which extends between the cross-member 126 and the second trailing arm 124. The flexible blade 146 is shaped and made of a suitable material for resiliently deforming in response to relative rotation between the cross-member 126 (and the first trailing arm 122) and the second trailing arm 124.

During operation, forces between the second trailing arm 124 and the cross-member 126 are transferred between one another through the flexible blade 146. The stiffness of the twist axle assembly 120 depends at least in part upon, the shape, size, material and even the orientation of the flexible blade 146.

In the second exemplary embodiment of the vehicle suspension system 120, the flexible blade 146 is rectangular in cross-section along its length, and therefore, the flexible blade 146 has a greater moment of inertia and resistance to bending in one direction than in another direction. Additionally, the flexible blade 146 is connected with the second trailing arm 124 and the cross-member 126 via a rotation means which allows the flexible blade 146 to rotate relative to the second trailing arm 124 and the cross-member 126. The rotation means may have any suitable form capable of rotating the flexible blade 146 and resisting damage during operation of the vehicle suspension system 120.

In operation, the flexible blade 146 only flexes in one direction, and thus, simply rotating the flexible blade 146 adjusts the moment of inertia of the flexible blade 146 in the rotating direction, which thereby alters the effective stiffness of the flexible blade 146 and the performance of the vehicle suspension assembly 120. As such, a vehicle owner can alter the performance of his or her vehicle by replacing or even rotating the flexible blade 146. Since the performance of the vehicle suspension assembly 120 may be altered by simply rotating the flexible blade 146, significant cost savings can be realized through economies of scale since all of the same components can be used for different vehicles with different performance characteristics. The flexible blade 146 may be attached with the second trailing arm 124 through any suitable means including, for example, fasteners or welding.

Figure 5:
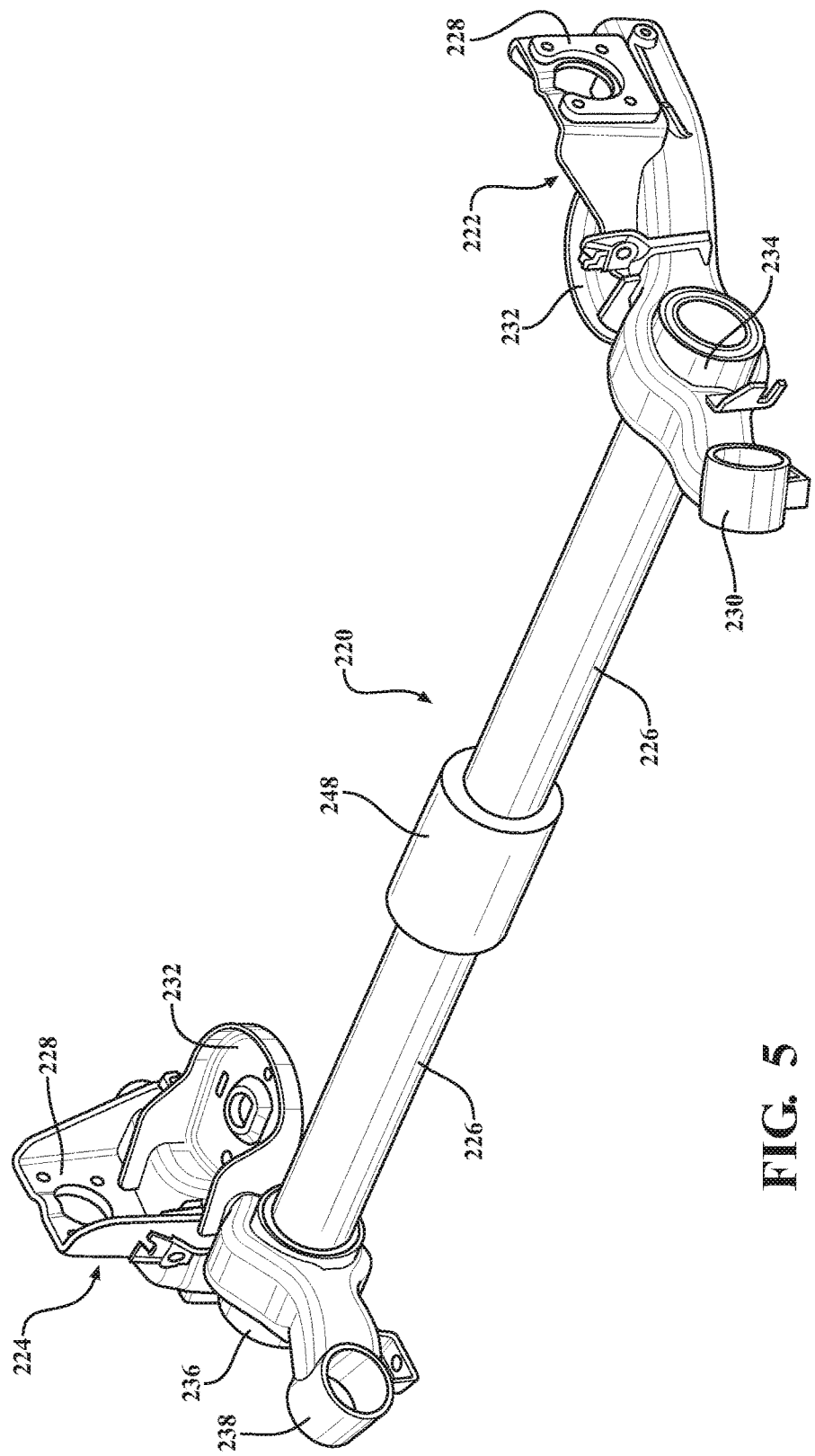
FIG. 5 is a perspective elevation view of a third exemplary embodiment of the twist axle assembly.

Referring now to FIGS. 5, 6a and 6b, a third exemplary embodiment of the vehicle suspension assembly 220 is generally shown with like numerals, separated by a prefix of "2", indicating corresponding parts with the first exemplary embodiment described above. The third embodiment is distinguished from the first two embodiments described above in that both, two cross-members 226 are provided, and those cross-members 226 are interconnected with one another via a coupling 248 which is spaced between the opposite ends 234, 236. The coupling 248, such as the coupling 248 shown in FIG. 4, controls the relative rotation between the two cross-members 226 and the first and second trailing arms 222, 224 relative to one another. In the exemplary embodiment, the coupling 248 is an active coupling which is filled with a magnetically reactive fluid and includes electric coils configured to activate the fluid. Activating and deactivating the electric coils has the effect of increasing or decreasing the resistance that the coupling 248 provides to relative rotation of the two cross-members 226 relative to one another. The coupling 248 may be actuated through any suitable means, e.g., mechanically, pneumatically, hydraulically, electrically, etc.

Obviously, many modifications and variations of the present invention are possible in light of the above teachings and may be practiced otherwise than as specifically described while within the scope of the appended claims.

What is claimed is:

1. A vehicle suspension component, comprising:
   first and second trailing arms that are spaced from one another for attachment with vehicle wheels;
   at least one cross-member rigidly connected with said first trailing arm and operably connected with said second trailing arm in a non-rigid manner;
   a rotation inhibitor operably connecting said at least one cross-member with said second trailing arm and resiliently resisting rotation of said at least one cross-member relative to said second trailing arm;
   wherein said rotation inhibitor includes a bushing that is made of an elastic material and that is compressible for resisting rotation of said at least one cross-member relative to said second trailing arm in one rotational direction and is stretchable for resisting rotation of said at least one cross-member relative to said second trailing arm in an opposite rotational direction; and
   wherein said rotation inhibitor further includes a stiff arm which is fixedly attached with and extends radially outwardly from said at least one cross-member and wherein said bushing is interposed between said stiff arm and said second trailing arm.

2. The vehicle suspension component as set forth in claim 1 wherein said at least one cross-member is a single beam which extends through an opening in said second trailing arm and further including a bearing between said beam and said second trailing arm for allowing said beam and said second trailing arm to rotate relative to one another.

3. The vehicle suspension component as set forth in claim 1 wherein said rotation inhibitor further includes a sleeve which is fixedly attached with said stiff arm and is fixedly attached with said at least one cross-member.

4. The vehicle suspension component as set forth in claim 3 wherein said sleeve is welded with said at least one cross-member.

5. A vehicle suspension component, comprising:
   first and second trailing arms that are spaced from one another for attachment with vehicle wheels, each of said trailing arms being formed as a single piece and being fixedly attached with a respective body mount and a wheel carrier;
   at least one cross-member rigidly connected with said first trailing arm and operably connected with said second trailing arm in a non-rigid manner;
   a rotation inhibitor operably connecting said at least one cross-member with said second trailing arm and resiliently resisting rotation of said at least one cross-member relative to said second trailing arm; and
   wherein said rotation inhibitor includes a blade which is operably coupled with said at least one cross-member and with said second trailing arm and which is deflectable for resisting relative rotation between said at least one cross-member and said second trailing arm.

6. The vehicle suspension component as set forth in claim 5 further including a sleeve which is fixedly attached with said at least one cross-member and wherein said blade extends radially outwardly from said sleeve to an end which is operably coupled with said second trailing arm.

7. The vehicle suspension component as set forth in claim 5 wherein said blade is made of a spring steel material.

8. A vehicle suspension component, comprising:
   first and second trailing arms that are spaced from one another for attachment with vehicle wheels, each of said trailing arms being formed as a single piece and being fixedly attached with a respective body mount and a wheel carrier;
   at least one cross-member rigidly connected with said first trailing arm and operably connected with said second trailing arm in a non-rigid manner;
   a rotation inhibitor operably connecting said at least one cross-member with said second trailing arm and resiliently resisting rotation of said at least one cross-member relative to said second trailing arm; and
   wherein said at least one cross-member includes a pair of cross-members with one of said cross-members being fixedly attached with said first trailing arm and the other of said cross-members being fixedly attached with said second trailing arm and wherein said rotation inhibitor includes a coupling which interconnects said pair of cross-members with one another and actively resists rotation of said cross-members relative to one another, said coupling including a magnetically reactive fluid and electric coils which are configured to active the fluid to increase or decrease the resistance that said coupling provides to relative rotation of said cross-members.

* * * * *